US006575492B2

(12) United States Patent
Davidson

(10) Patent No.: US 6,575,492 B2
(45) Date of Patent: Jun. 10, 2003

(54) LATERAL TORSO SUPPORTS FOR FOLDING WHEELCHAIRS

(75) Inventor: Rodney Davidson, Torrance, CA (US)

(73) Assignee: Convaid Products, Inc., Torrance, CA (US)

( * ) Notice: Subject to any disclaimer, the term of this patent is extended or adjusted under 35 U.S.C. 154(b) by 44 days.

(21) Appl. No.: 09/818,984

(22) Filed: Mar. 26, 2001

(65) Prior Publication Data

US 2002/0135158 A1 Sep. 26, 2002

(51) Int. Cl.[7] .............................. B62B 7/08; A47C 7/46

(52) U.S. Cl. ........................ 280/647; 280/644; 280/650; 280/304.1; 297/411.1

(58) Field of Search ................................ 280/642, 644, 280/646, 647, 650, 304.1; 297/466, 411.1, 411.2

(56) References Cited

U.S. PATENT DOCUMENTS 4,073,537 A * 2/1978 Hammersburg ............. 297/384
RE30,867 E * 2/1982 Gaffney ...................... 280/642
4,617,919 A * 10/1986 Suhre .......................... 128/78
4,640,525 A * 2/1987 Jensen et al. ............... 280/642
4,688,557 A * 8/1987 Bradstreet .................... 128/71
5,437,609 A * 8/1995 Leonard et al. ............... 601/91
5,551,756 A * 9/1996 Gurasich et al. ......... 297/440.2
5,593,211 A * 1/1997 Jay et al. ..................... 297/383
5,967,613 A * 10/1999 McKeever .................. 297/397
6,176,508 B1 * 1/2001 Malassigne et al. ........ 280/648
6,213,558 B1 * 4/2001 Axelson et al. ............. 297/464
6,257,664 B1 * 7/2001 Chew et al. ............. 297/284.9
6,345,835 B1 * 2/2002 Watkins ...................... 280/650
6,378,947 B1 * 4/2002 Barber et al. .......... 297/452.25

* cited by examiner

*Primary Examiner*—Brian L. Johnson
*Assistant Examiner*—Jeffrey J Restifo
(74) *Attorney, Agent, or Firm*—Oppenheimer Wolff & Donnelly

(57) ABSTRACT

A laterally collapsible wheelchair includes a restraint system for preventing lateral movement of wheelchair occupants. The restraint system includes a pair of lateral supports, which are releasably attached to restrict the movement of a person seated in the wheelchair. The wheelchair is laterally collapsible to allow for ease of transportation and storage. The restraint system is provided to restrain a wheelchair occupant without hindering the lateral collapsibility of the wheelchair. The restraint system is releasably attachable to a backing material of a back portion of the wheelchair. In one embodiment, the backing material is a netting material which allows for easy attachment of the restraint system.

35 Claims, 4 Drawing Sheets

FIG. 1
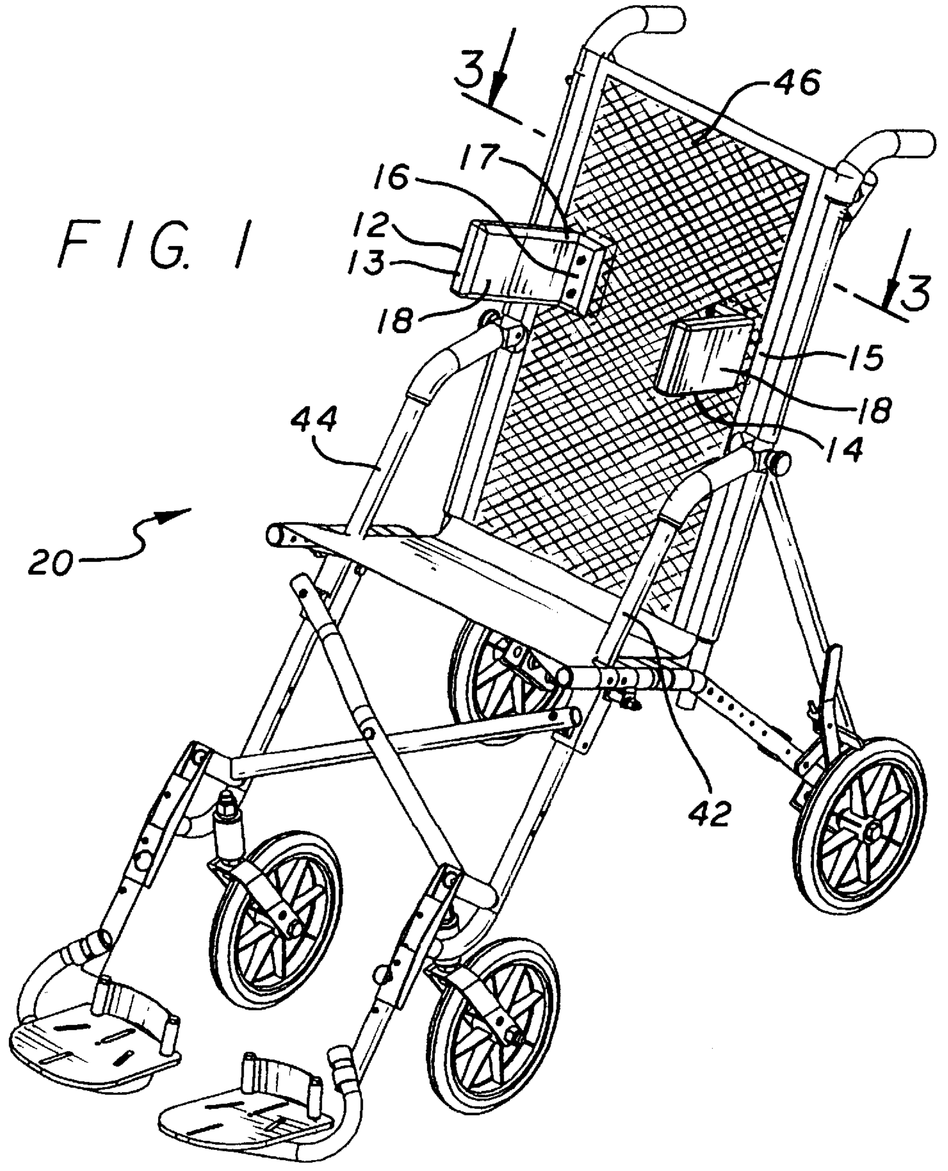
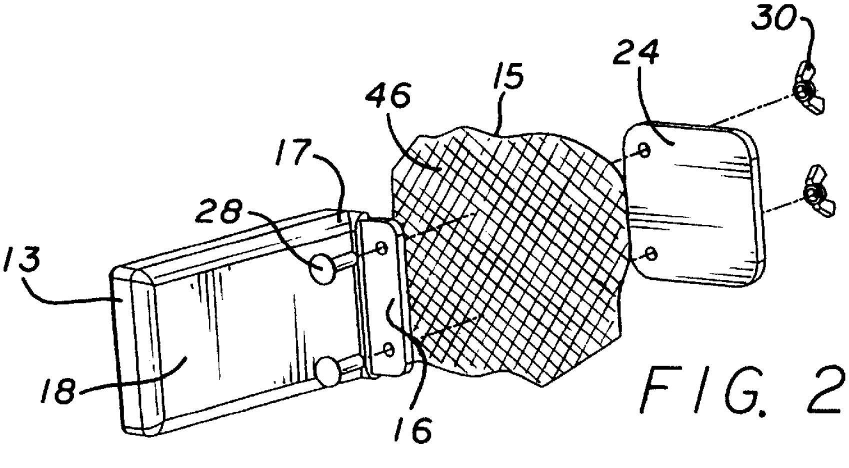
FIG. 2

LATERAL TORSO SUPPORTS FOR FOLDING WHEELCHAIRS

BACKGROUND OF THE INVENTION

1. Field of the Invention

The present invention relates to folding wheelchairs. Specifically, the invention relates to lateral supports for supporting wheelchair occupants and limiting their lateral movement while seated in a wheelchair.

2. General Background and State of the Art

The prior art includes many examples of wheelchairs and strollers that are used for the transport of infants, children, invalids, or anyone suffering from a debilitating disease or condition. Wheelchairs may also be used when a person is too weak to walk or in other similar situations. Often it is desirable to have a foldable wheelchair to allow for convenient transportation and storage when the wheelchair is not in use.

It is also often desirable to provide restraints on a wheelchair to restrict an occupant's movement. The prior art includes several references which disclose restraint systems. One such reference, U.S. Pat. No. 4,094,531, discloses a foldable stroller for children having a back portion and a pair of lateral side elements which are connected in the back of the wheelchair by split crosspieces having a common control bar and an actuating grip therebetween. The lateral side pieces are placed high on the back of the stroller to restrict movement of the wheelchair occupant's head. The connection between the lateral side elements and the back of the wheelchair also allows the wheelchair to be folded in a side-to-side manner without a great degree of interference from the lateral side elements. However, one drawback to this type of configuration is that only the occupant's head is prevented from moving while the occupant is seated in the wheelchair. Other parts of the occupant's body are free to move, which can cause problems when the occupant has debilitating conditions such as involuntary spastic movement of various other parts of his or her body.

Another prior art reference is disclosed at U.S. Pat. No. 4,353,577. This reference discloses a collapsible stroller having an adjustable backrest. This stroller includes a pair of headrest side extensions which also restrict the movement of a wheelchair occupant's head. This reference also is therefore limited to restricting the movement of a person's head. The configuration of this reference, as with the previous reference, does nothing to restrict movement of other parts of a wheelchair occupant's body.

Accordingly, it is one object of the invention to provide a foldable wheelchair. It is another object of the invention to provide an adequate system of restraint for a wheelchair occupant's torso. It is yet another object of the invention to provide a folding wheelchair having such a system of restraining a wheelchair occupant's torso.

INVENTION SUMMARY

The present invention provides a folding wheelchair having a lateral restraint system which includes a pair of lateral supports positioned to restrict lateral movement of a wheelchair occupant. Each of the lateral supports includes a base portion and an elongated portion. The base portion is connectable to the back portion of a wheelchair, such that when an occupant is seated in the wheelchair, the lateral supports restrict the movement of his or her torso.

The present invention also provides that the lateral restraint system is both flexible and adjustable, depending on the type of wheelchair to which it is attached and also depending on the size of the wheelchair occupant. The lateral supports are also releasably attached to the back portion of the wheelchair such that they can be adjusted and moved depending on the size of the wheelchair occupant. The invention contemplates that different types of attachments can be used to releasably attach the lateral supports to the back portion of a wheelchair. The invention also contemplates that the back portion of the wheelchair may be a standard backing material or may also be, in an alternative embodiment, a netting material. A base plate coupled to the base portion of each lateral support is releasably attachable to the back portion of the wheelchair. A bolt and wing nut assembly may be used, which includes at least one bolt and at least one wing nut for each lateral support. In an alternative embodiment, the base plate can be coupled to the base portion by a hook and pile assembly.

In the embodiment where a netting material is used for the backing material, the netting material provides for improved ventilation and easy attachment of the lateral supports. The lateral supports can be connected through holes in the netting material without the need for cutting or punching the netting material. Additionally, the pre-installation of grommets is not needed for the attachment of the lateral supports.

BRIEF DESCRIPTION OF THE DRAWINGS

FIG. 1 is a wheelchair having a pair of lateral supports releasably attached thereto;

FIG. 2 is a close-up view of a lateral support being attached to the back portion of a wheelchair;

DETAILED DESCRIPTION OF THE EMBODIMENTS

Figure 3:
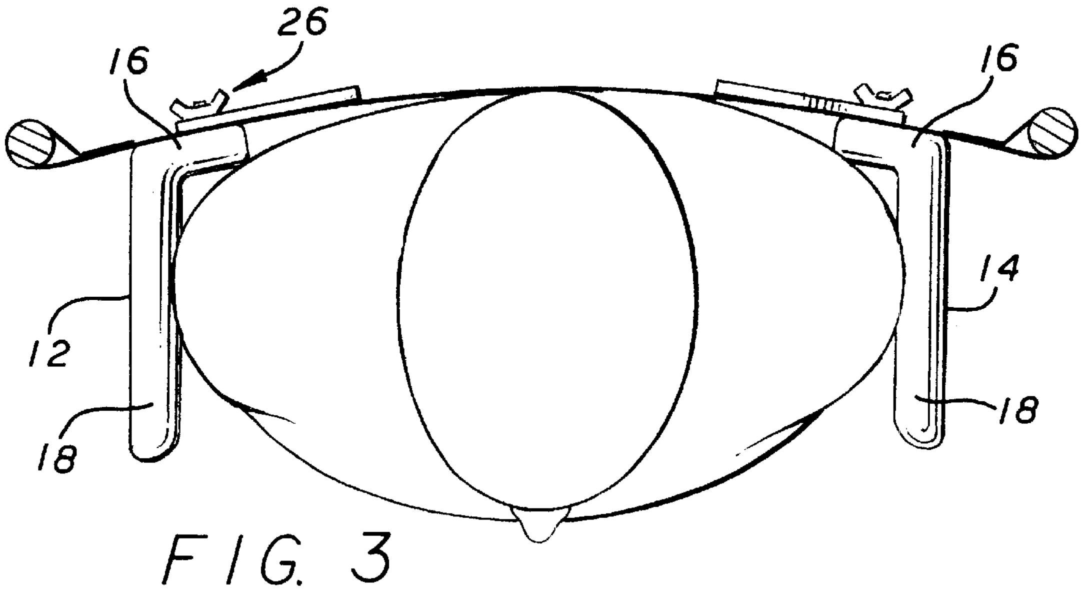
FIG. 3 is an overhead view of a person being laterally supported by the present invention.

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

FIG. 1 is a perspective view of a wheelchair having a lateral restraint system. The lateral restraint system comprises a pair of lateral supports, including a first lateral support 12 and a second lateral support 14. The first lateral support 12 and the second lateral support 14 may be centrally positioned on a back portion 15 of a wheelchair 20. Each lateral support 12 and 14 includes a base portion 16 and an elongated portion 18. In the preferred embodiment, each elongated portion 18 is substantially perpendicular to each base portion 16. However, other angles may be selected. Each of the first and second lateral supports 12 and 14 are releasably attached to the back portion 15 of the wheelchair 20. The wheelchair may also include additional lateral supports to restrict head movement of a wheelchair occupant.

Figure 7:
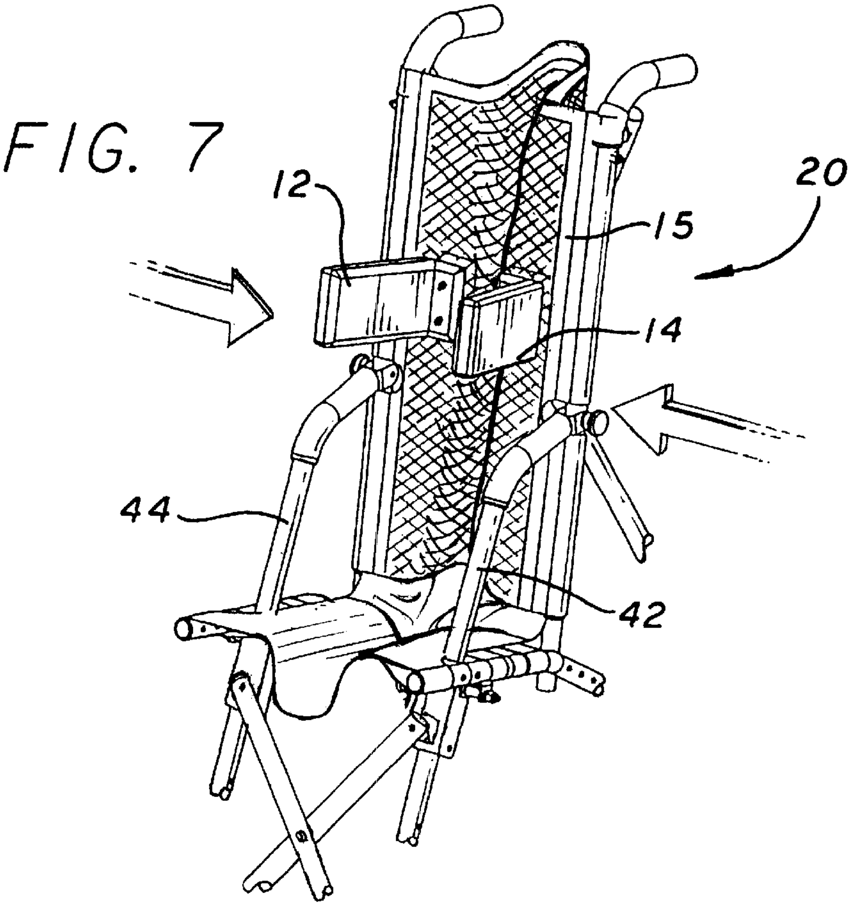
FIG. 7 is a wheelchair having a pair of lateral supports that is shown to be collapsible in a side-to-side manner.

The wheelchair 20 of the present invention is also laterally collapsible for easy storage and transportation. FIG. 7 is a perspective view of the wheelchair in state of partial collapse in a side-to-side manner to show the lateral movement of the wheelchair to a folded position. The wheelchair 20 includes a frame which has a left frame portion 42 and a right frame portion 44, with the backing portion 15 positioned between the left frame portion 42 and the right frame portion 44. Each of the lateral supports 12 and 14 are releasably attached to the backing portion 15. When the wheelchair 20 is collapsed in a side-to-side manner, the positioning of each lateral support does not interfere with the degree of lateral collapsibility. When added to the backing portion 15 of the wheelchair 20, the lateral supports 12 and 14 are collapsible towards each other corresponding to the left frame portion 42 and the right frame portion 44. Thus, the present invention provides a laterally collapsible wheelchair having a restraint system for a wheelchair occupant's torso that does not interfere with the lateral collapsibility of the wheelchair 20. This is an advantageous feature over the examples of wheelchairs in the prior art, in which only head restraint systems are used with laterally collapsible chairs.

The lateral supports 12 and 14 may be flexible and may also be adjustable and movable to accommodate different types of wheelchairs to which they are releasably attached and also to accommodate different sizes of wheelchair occupants. Therefore, the lateral supports 12 and 14 are releasably attached to the back portion 15 of the wheelchair 20. The invention contemplates that different methods of releasably attaching the lateral supports to the back portion of the wheelchair may be used. For example, as shown in FIG. 2, a base portion 16 may be releasably attached to the back portion 15 of the wheelchair 20 using a base plate 24 and a wing and nut assembly 26. Each wing and nut assembly 26 includes a bolt 28 and a wing nut 30. The bolt 28 is insertable through the base portion 16 through the back portion 15 of the wheelchair 20 and also through the base plate 24. The wing nut 30 is then screwed over the protruding end of the bolt 28 to releasably attach the support to the back portion 15 of the wheelchair 20.

Figure 4:
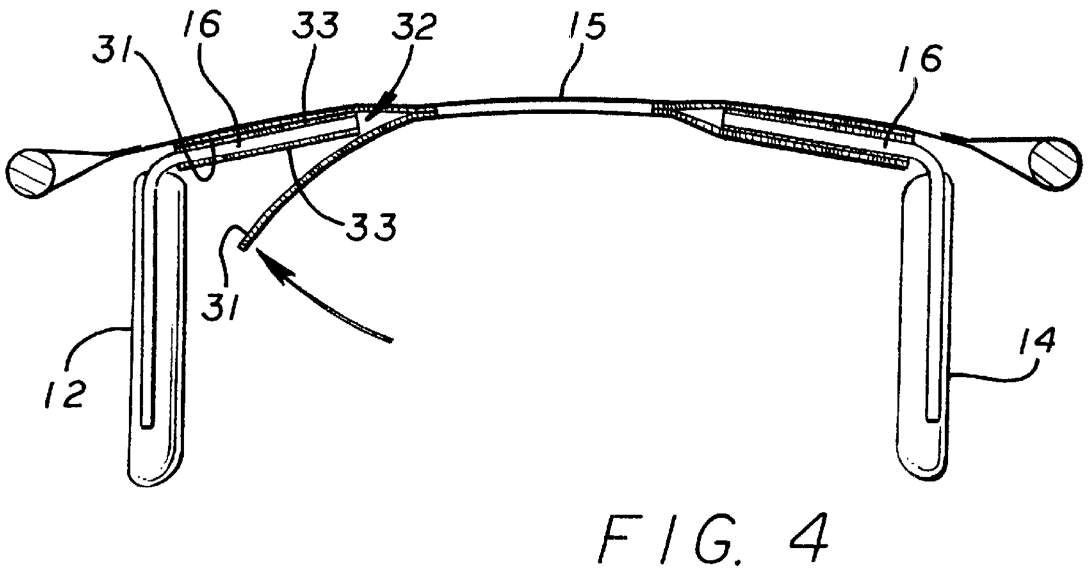
FIG. 4 is an overhead view of the back portion of a wheelchair having the pair of lateral supports with a hook and pile assembly releasably attaching the lateral supports to the back portion.

In another embodiment shown in FIG. 4, a hook and pile assembly 32 is used to releasably attach the base portion 16 to the backing portion 15 of the wheelchair 20. The hook and pile assembly 32 may comprise a Velcro-type attachment, such that the base portion 16 is releasably attached to the back portion 15 of the wheelchair 20 by placing a Velcro-type portion on a back each base portion and attaching to a receiver portion coupled to the back portion 15. For example, the hook portion of the Velcro attachment is found at 31, with the loop portion at 33, or vice versa. Regardless of the method of releasably attaching each lateral support to the back portion 15 of the wheelchair 20, the present invention contemplates that each lateral support 12 and 14 and the back portion 15 of the wheelchair 20 are flexible to allow a wheelchair occupant to recline in the wheelchair 20 while at the same time providing a sturdy and secure support for the occupant's torso.

FIG. 3 is an overhead view of a wheelchair occupant seated and being restrained laterally by the first and second lateral supports 12 and 14. FIG. 3 also shows the bolt and wing nut assembly 26 method of releasably attaching the first and second lateral supports 12 and 14 to the back portion 15 of the wheelchair 20. Note in FIG. 3 that the wheelchair occupant is pressed against the back portion 15 of the wheelchair 20, causing a slight concave configuration of the back portion 15. This concave configuration causes the elongated portions of the first and second lateral supports to move towards each other, thereby increasing the level of restraint provided for the wheelchair occupant's torso. Each elongated portion on each support includes a distal end 13 away from the backing material and a proximate end 17 nearer to the backing material. The lateral supports 12 and 14 are configured to deflect when an occupant recesses into the backing material such that the distal ends 13 of the elongated portions deflect toward each other.

Similarly, a hook and pile assembly can be substituted for assembly 26 to accomplish the same purpose. The Velcro-type attachment causes the elongated portions of the first and second lateral supports 12 and 14 to move inward toward each other when the wheelchair occupant exerts pressure against the back portion 15 of the wheelchair. FIG. 4 shows this embodiment, where a slight concave configuration of the back portion 15 causes the first and second lateral supports 12 and 14 to remain in a substantially parallel relationship relative to each other. However, it is not necessary to the invention that lateral supports 12 and 14 be geometrically parallel to one another, so long as they operate compatibly. As with the configuration in FIG. 3, the configuration in FIG. 4 provides a level of restraint necessary to maintain the wheelchair occupant's torso in a normal seated position.

Figure 5:
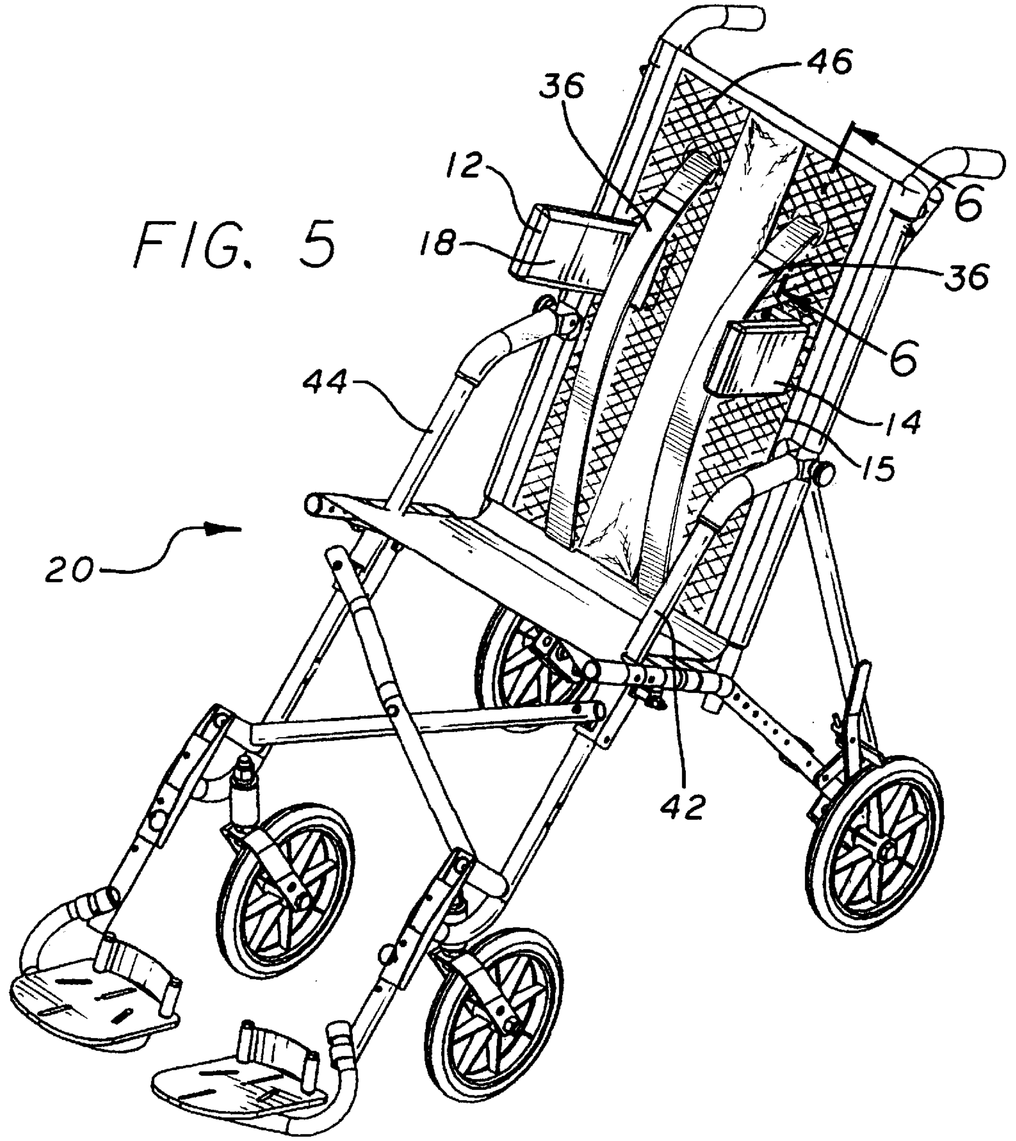
FIG. 5 is a wheelchair having a pair of shoulder straps releasably attached to the back portion.
Figure 6:
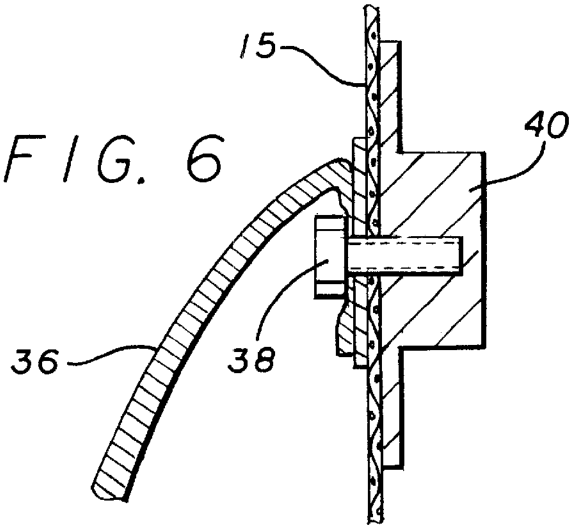
FIG. 6 is a close-up view of a method of releasably attaching the shoulder straps to the back portion of the wheelchair.

FIG. 5 shows the wheelchair 20 having the lateral restraint system including the first and second lateral supports 12 and 14. FIG. 5 also shows the wheelchair 20 including a pair of shoulder straps 36 releasably attached to the back portion 15 of the wheelchair 20. The shoulder straps 36 provide an extra level of support for the wheelchair occupant's torso. Therefore, where extra support is needed for an occupant of the wheelchair, the combination of the first and second lateral supports 12 and 14 and the shoulder straps 36 provide an enhanced level of restraint. The pair of shoulder straps 36 are releasably attached to the back portion 15 of the wheelchair 20 using the configuration shown in FIG. 6. FIG. 6 is a close-up view of the attachment mechanism for the pair of shoulder straps 36. In FIG. 6, a bolt 38 is inserted between an upper portion of each shoulder strap 36, the backing material 15, and a shoulder strap base portion 40.

The back portion 15 of the wheelchair 20 may be a typical mesh configuration. In another embodiment, a netting material 46 is used as the back portion 15 of the wheelchair 20. The netting material 46 used in this embodiment provides an additional level of flexibility for a wheelchair occupant seated in the wheelchair 20. The netting material 46 also provides an easier mechanism for releasably attaching each lateral support 12 and 14 to the wheelchair 20. Both the bolt and wing nut assembly 26 and the hook and pile assembly 32 are releasably attachable to the netting material 46 to provide a further level of occupant restraint. For example, the netting material 46, which provides more flexibility to the back portion 15, is configurable to a more concave configuration when a wheelchair occupant exerts pressure on the back portion 15. This causes the first and second lateral supports to exert more force inward toward each other, providing a greater degree of restraint for the occupant's torso.

Figure 8:
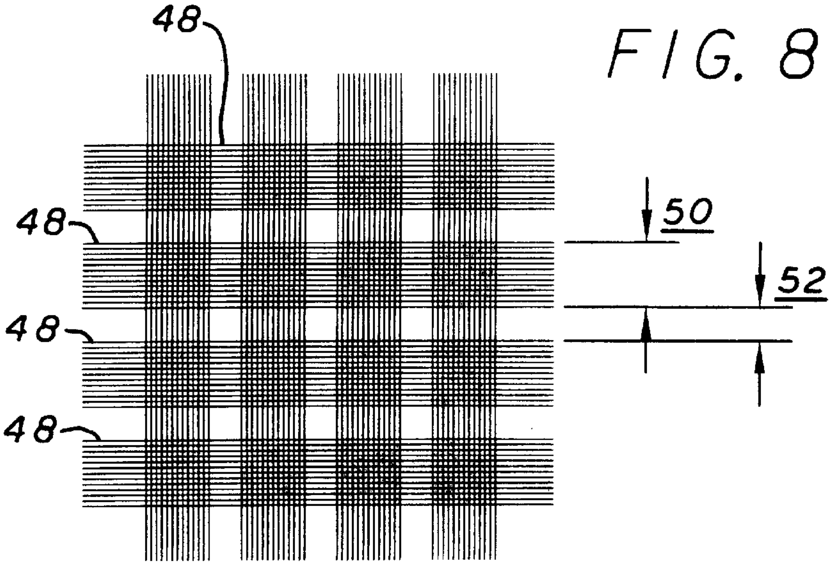
FIG. 8 is a close-up view of a portion of netting material.

FIG. 8 is a close-up view of a portion of a preferred embodiment of the netting material 46. The netting material 46 is an interwoven material having a plurality of interwoven strands 48. The interwoven material includes a plurality of apertures between the strands as they cross over each other in the interwoven manner. The apertures are of a sufficient height and width to allow a fastening mechanism, such as a bolt 28 in a bolt and wing assembly 26, to pass through the apertures. One available netting material is known by the trade name of Textilene and is manufactured by Twitchell Corporation. The interwoven material is a PVC-coated fabric such as vinyl-coated polyester and comprises a plain one-over-one weave of 0.25 inch yarn. The yarn comprises both pigmented vinyl and polyester core yarn and includes a mildew resistance component, which may be arsenic fungicide, and a flame retardant, which may be antimony oxide. The interwoven material is of a sufficient tensile and burst strength to accommodate the weight of a wheelchair occupant seated in a wheelchair. Reference numeral 50 indicates an approximate height of a strand 48, and reference numeral 52 indicates an approximate width of a strand 48. A strand of the interwoven material is approximately 5/16 inch wide and approximately 5/16 inch high. One benefit of using this type of netting material 46 is that it allows a great many choices for positioning the lateral supports to maximize efficacy and comfort.

I claim:

1. An assembly for laterally supporting wheelchair occupants, said assembly comprising:

a pair of supports coupled to a back portion of a wheelchair and positioned to provide a lateral support for a wheelchair occupant's torso, each support including a base portion and an elongated portion substantially perpendicular to the base portion, wherein the elongated portions are configured to move toward each other when an occupant's torso pushes against the back portion.

2. The assembly of claim 1, wherein the supports are flexible.

3. The assembly of claim 1, wherein the supports are adjustable.

4. The assembly of claim 1, wherein the supports are releasably attached to the wheelchair.

5. The assembly of claim 1, wherein the supports are releasably attached to a netting material at least partially forming the back portion of the wheelchair.

6. The assembly of claim 5, wherein the supports are centrally positioned on said netting material.

7. The assembly of claim 5, wherein the netting material is flexible to allow an occupant to recess into said netting material, each elongated portion on each support having a distal end away from the netting material and a proximate end nearer to the netting material, the pair of supports configured to deflect when an occupant recesses into the netting material such that the distal ends of the elongated portions deflect toward each other.

8. The assembly of claim 1, further comprising a base plate coupled to the base portion of each support.

9. The assembly of claim 8, wherein the base plate is coupled to the base portion by a bolt and wing nut assembly, said assembly including at least one bolt and at least one wing nut.

10. The assembly of claim 8, wherein the base plate is coupled to the base portion by a hook and pile assembly.

11. The assembly of claim 8, wherein the supports are releasably attached to a backing material at least partially forming the back portion of the wheelchair, the backing material being positioned between the base portion and the base plate of each support.

12. The assembly of claim 11, wherein the backing material is flexible to allow an occupant to recess into said backing material, each elongated portion on each support having a distal end away from the backing material and a proximate end nearer to the backing material, the pair of supports configured to deflect when an occupant recesses into the backing material such that the distal ends of the elongated portions deflect toward each other.

13. A method of laterally supporting a wheelchair occupant's torso, comprising:

positioning a pair of supports to provide lateral support to the torso, each support including a base portion and an elongated portion substantially perpendicular to the base portion, each elongated portion having a distal end and a proximate end; and releasably attaching each support to a back portion of a wheelchair, the support being attached to the back portion by coupling each base portion to a base plate, wherein the distal end of each support moves relatively toward the distal end of the other support when a wheelchair occupant exerts pressure on the back portion by reclining in the wheelchair.

14. The method of claim 13, further comprising fastening each support to the back portion with a hook and pile assembly, the hook and pile assembly allowing each support to remain flexible as an occupant reclines in the wheelchair.

15. The method of claim 13, wherein the distal end of each support is adopt an outward orientation relative to the distal end of the other support when a wheelchair occupant removes pressure on the back portion.

16. The method of claim 13, wherein the supports are flexible.

17. The method of claim 13, wherein the supports are adjustable.

18. The method of 13, wherein a netting material at least partially forms the back portion of the wheelchair, the netting material being positioned between the base portion and the base plate of each support to secure the pair of supports to the wheelchair.

19. The method of claim 18, wherein the supports are centrally positioned on said netting material.

20. The method of claim 18, wherein the netting material is flexible to allow an occupant to recess into said netting material, each elongated portion on each support having a distal end away from the netting material and a proximate end nearer to the netting material, the pair of supports configured to deflect when an occupant recesses into the netting material that the distal ends of the elongated portions deflect toward each other.

21. The method of claim 13, the base plate is coupled to the base portion by a bolt and wing nut assembly, said assembly including at least one bolt and at least one wing nut.

22. The method of claim 13, wherein the base plate is coupled to the base portion by a hook and pile assembly.

23. The method of claim 13, wherein a backing material at least partially forms the back portion of the wheelchair, the backing material being positioned between the base portion and the base plate of each support to secure the pair of supports to the wheelchair.

24. The method of claim 23, wherein the backing material is flexible to allow an occupant to recess into said backing material, each elongated portion on each support having a distal end away from the backing material and a proximate end nearer to the backing material, the pair of supports configured to deflect when an occupant recesses into the backing material such that the distal ends of the elongated portions deflect toward each other.

25. A laterally collapsible wheelchair having a support assembly for supporting a wheelchair occupant's torso, the wheelchair comprising:

a frame configured to collapse side-to-side, said frame having a left frame portion, a right frame portion, and a back portion; and a pair of flexible, adjustable supports, each adjustable support including a base portion and an elongated portion substantially perpendicular to the base portion, the pair of adjustable supports being positioned on said back portion of said frame to provide a lateral support, wherein the elongated portions are configured to move toward each other when pressure is applied against the back portion.

26. The wheelchair of claim 25, wherein the back portion at least partially includes an interwoven material forming a netting material, the netting material providing flexible support for an occupant of the wheelchair.

27. The assembly of claim 26, wherein the netting material is positioned between the base portion and a base plate to secure the pair of supports to the wheelchair, the base plate being coupled to the base portion.

28. The assembly of claim 27, the supports are centrally positioned on said netting material.

29. The assembly of claim 27, wherein the base plate is coupled to the base portion by a bolt and wing nut assembly, said assembly including at least one bolt and at least one wing nut.

30. The assembly of claim 27, wherein the base plate is coupled to the base portion by a hook and pile assembly.

31. The assembly of claim 27, wherein the netting material is flexible to allow an occupant to recess into said netting material, each elongated portion on each support having a distal end away from the netting material and a proximate end nearer to the netting material, the pair of supports configured to deflect when an occupant recesses into the netting material such that the distal ends of the elongated portions deflect toward each other.

32. The method of claim 25, wherein a distal end of each support is configured to adopt an outward orientation relative to the distal end of the other support when pressure is relieved from the back portion.

33. The assembly of claim 25, wherein the supports are releasably attached to the wheelchair.

34. The assembly of claim 25, wherein the back portion at least partially includes a backing material positioned between the base portion and a base plate of each support to secure the pair of supports to the wheelchair, the base plate being coupled to the base portion.

35. The assembly of claim 34, wherein the backing material is flexible to allow an occupant to recess into said backing material, each elongated portion on each support having a distal end away from the backing material and a proximate end nearer to the backing material, the pair of supports configured to deflect when an occupant recesses into the backing material such that the distal ends of the elongated portions deflect toward each other.

* * * * *